(12) United States Patent
Deegan (10) Patent No.: US 10,088,240 B2
(45) Date of Patent: Oct. 2, 2018

(54) MANIFOLD FOR PROCESS VARIABLE TRANSMITTER WITH STEAM COUPLING

(71) Applicant: Dieterich Standard, Inc., Boulder, CO (US)

(72) Inventor: Paul Timothy Deegan, Denver, CO (US)

(73) Assignee: DIETERICH STANDARD, INC., Boulder, CO (US)

(*) Notice: Subject to any disclaimer, the term of this patent is extended or adjusted under 35 U.S.C. 154(b) by 311 days.

(21) Appl. No.: 14/487,533

(22) Filed: Sep. 16, 2014

(65) Prior Publication Data

US 2016/0076816 A1    Mar. 17, 2016

(51) Int. Cl.
| | | |
|---|---|---|
| F28D 7/00 | (2006.01) | |
| F16K 49/00 | (2006.01) | |
| G01L 19/00 | (2006.01) | |
| F16K 27/00 | (2006.01) | |
| F16K 3/02 | (2006.01) | |

(52) U.S. Cl.
CPC ............ *F28D 7/00* (2013.01); *F16K 3/029* (2013.01); *F16K 27/003* (2013.01); *F16K 49/005* (2013.01); *G01L 19/0015* (2013.01)

(58) Field of Classification Search
CPC ...... F16K 49/005; F16K 3/029; F16K 27/003; G01L 19/0015; G01L 19/003; F28D 7/00
USPC ......................................................... 137/340
See application file for complete search history.

(56) References Cited

U.S. PATENT DOCUMENTS

| | | |
|---|---|---|
| 2,871,881 A | 2/1959 | Hewson |
| 3,267,729 A | 8/1966 | Hodkinson et al. |
| 4,151,745 A | 5/1979 | Cordy |
| 4,182,362 A | 1/1980 | Hewson et al. |

(Continued)

FOREIGN PATENT DOCUMENTS

| | | |
|---|---|---|
| CN | 101072988 A | 11/2007 |
| CN | 201476819 U | 5/2010 |

(Continued)

OTHER PUBLICATIONS

NPT—National Pipe Thread Taper—ANSI B1.20.1. The Engineering Tool Box [online], 2006 [retrieved on Jul. 22, 2016]. Retrieved from the Internet. <URL: http://www.engineeringtoolbox.com/npt-national-pipe-taper-threads-d_750.html>.*

(Continued)

*Primary Examiner* — Michael R Reid
*Assistant Examiner* — Jonathan Waddy
(74) *Attorney, Agent, or Firm* — Westman, Champlin & Koehler, P.A.

(57) ABSTRACT

A process variable transmitter manifold is provided that includes a valve body having a valve and a flanged mounting face. The valve body has a port therethrough for selectively coupling a process fluid through the valve, and a cooling channel in the valve body. The cooling channel has an inlet, an outlet, and a passage connecting the inlet and the outlet. A method of controlling temperature of a process fluid in a manifold is also provided. The method includes passing fluid through a channel in the manifold, passing the process fluid through at least one bore through the manifold, and adjusting temperature of the process fluid through conductive cooling or heating of the process fluid based on the certain temperature of the fluid passing through the channel.

20 Claims, 7 Drawing Sheets

(56) References Cited

U.S. PATENT DOCUMENTS

| | | | |
|---|---|---|---|
| 4,343,193 A | | 8/1982 | Dawson |
| 4,434,655 A | | 3/1984 | Summerfield |
| 4,738,276 A | | 4/1988 | Adams |
| 4,913,400 A | | 4/1990 | Tiefenthaler |
| 4,938,246 A | * | 7/1990 | Conley .................... B08B 1/00 137/15.07 |
| 4,977,917 A | * | 12/1990 | Adams .................... F16K 11/20 137/595 |
| 5,542,450 A | | 8/1996 | King et al. |
| 5,762,100 A | | 6/1998 | Wilda et al. |
| 5,980,466 A | | 11/1999 | Thomson |
| 6,176,262 B1 | | 1/2001 | Nimberger |
| 6,591,695 B1 | | 7/2003 | Brookshire et al. |
| 6,609,730 B1 | * | 8/2003 | Hutton ................ G01L 19/0015 285/114 |
| 6,914,531 B1 | | 7/2005 | Young |
| 6,945,123 B1 | | 9/2005 | Kuehl et al. |
| 7,980,481 B2 | | 7/2011 | Fandrey et al. |
| 8,960,018 B2 | | 2/2015 | Stehle |
| 9,151,648 B2 | | 10/2015 | Strom et al. |
| 2005/0210999 A1 | | 9/2005 | Sylvia |
| 2006/0122739 A1 | | 6/2006 | Fandrey et al. |
| 2007/0034018 A1 | | 2/2007 | Bell |
| 2012/0048031 A1 | | 3/2012 | Furlong |
| 2015/0276437 A1 | | 10/2015 | Palmiscno |

FOREIGN PATENT DOCUMENTS

| | | |
|---|---|---|
| CN | 203414117 U | 1/2014 |
| CN | 203672419 U | 6/2014 |
| GB | 1 202 147 | 8/1970 |
| GB | 2 301 676 | 12/1996 |
| JP | S60-192181 | 9/1985 |
| JP | S60-196483 | 10/1985 |
| JP | H01-224575 | 9/1989 |
| JP | H04-1525 | 1/1992 |

OTHER PUBLICATIONS

Notification of Transmittal of the International Search Report and the Written Opinion of the International Searching Authority, from PCT/US2015/024460, dated Jul. 15, 2015.

Notification of Transmittal of the International Search Report and the Written Opinion of the International Searching Authority, from PCT/US2015/038967, dated Sep. 9, 2015.

"Instrument Manifolds for the Process and Gas Industries", PGI International, 16101 Vallen Drive, Houston, TX, pp. 1-67, May 2002.

Office Action from U.S. Appl. No. 14/497,556, dated Mar. 4, 2016.

First Office Action from Chinese Patent Application No. 201510023350.4, dated Oct. 16, 2017, 16 pages.

Communication from European Patent Application No. 15745296.2, dated May 17, 2017.

First Office Action from Japanese Patent Application No. 2017-513201, dated Feb. 27, 2018.

First Office Action from European Patent Application No. 15745296.2, dated Apr. 30, 2018.

First Office Action from Chinese Patent Application No. 201510023350.4, dated Apr. 23, 2018.

* cited by examiner

MANIFOLD FOR PROCESS VARIABLE TRANSMITTER WITH STEAM COUPLING

BACKGROUND

The present disclosure relates flow of a process fluid in an industrial process. More specifically, the present disclosure relates to cooling in a manifold for a process variable transmitter.

In oil refineries the use of orifice plates, averaging pitot tubes, or the like to measure flow is a common practice. Some process fluid being measured may be at temperatures of approximately 700° F. and often solidifies below approximately 200° F. Process variable transmitters that measure and communicate flow rates and other variables have electronics that typically cannot operate at temperatures above about 200° F. Because of this, direct mounting or close coupling of a process variable transmitter to a process flow pipe cannot be accomplished due to overheating of the transmitter electronics caused by the high temperature of the process fluid. To alleviate the overheating of transmitter electronics, process variable transmitters are often located some distance away from process fluid piping.

To separate transmitter electronics from the process piping, small bore impulse piping may be used Impulse piping often requires junctions and joins, and can be difficult to maintain without leak points in the impulse piping connections. Further, as the amount of process fluid in a small bore pipe is small, process fluid temperatures can drop rapidly in impulse piping. When a process fluid in a pipe, especially in a small bore pipe, is at a higher temperature than the air surrounding it, heat passes through the wall of the pipe from the process fluid to the surrounding air. This heat loss will cause the temperature of the process fluid to fall.

Certain process fluids will solidify if the temperature drops below a specific threshold. For example, at a temperature of about 200° F., heavy crude typically solidifies. Other process fluids may solidify at different temperatures. This is a problem when measuring pressure and the process fluid solidifies in the measurement impulse line.

To reduce the chances of solidification of process fluid in impulse piping, which can create a blockage, low pressure steam (on the order of 30 pounds per square inch) is used for steam tracing in some environments. Steam is typically available as a utility in the area of process flow measurement. Steam trace pipes are small bore pipes that are run next to or in close proximity to impulse piping, and contain pressurized steam at a certain temperature, often about 212-230° F., that assists in maintenance of the temperature of process fluid in the impulse pipes high enough to prevent their solidification.

Precipitate accumulation is another common cause of blockage in impulse piping. Solids in a flow stream will have a tendency to accumulate at the lowest point in an impulse tube arrangement. Impulse tubing is often plumbed around and over obstacles, such as by using elbows and traps, resulting in many areas where solids can collect.

Further, process leaks in impulse tubing may result in erroneous readings at a process variable transmitter, such as erroneous differential pressure readings, and can have a significant effect on flow measurement accuracy. The potential for a leak in a differential pressure flow measurement system is directly proportional to the number of connections in the system.

The discussion above is merely provided for general background information and is not intended to be used as an aid in determining the scope of the claimed subject matter. The claimed subject matter is not limited to implementations that solve any or all disadvantages noted in the background.

SUMMARY

A process variable transmitter manifold is provided that includes a valve body having a valve and a flanged mounting face. The valve body has a port therethrough for selectively coupling a process fluid through the valve, and a cooling channel in the valve body. The cooling channel has an inlet, an outlet, and a passage connecting the inlet and the outlet. A method of controlling temperature of a process fluid in a manifold is also provided. The method includes passing fluid through a channel in the manifold and couple to the process fluid through at least one bore through the manifold. The manifold is heated or cooled by the fluid passing through the channel.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION

Figure 1:
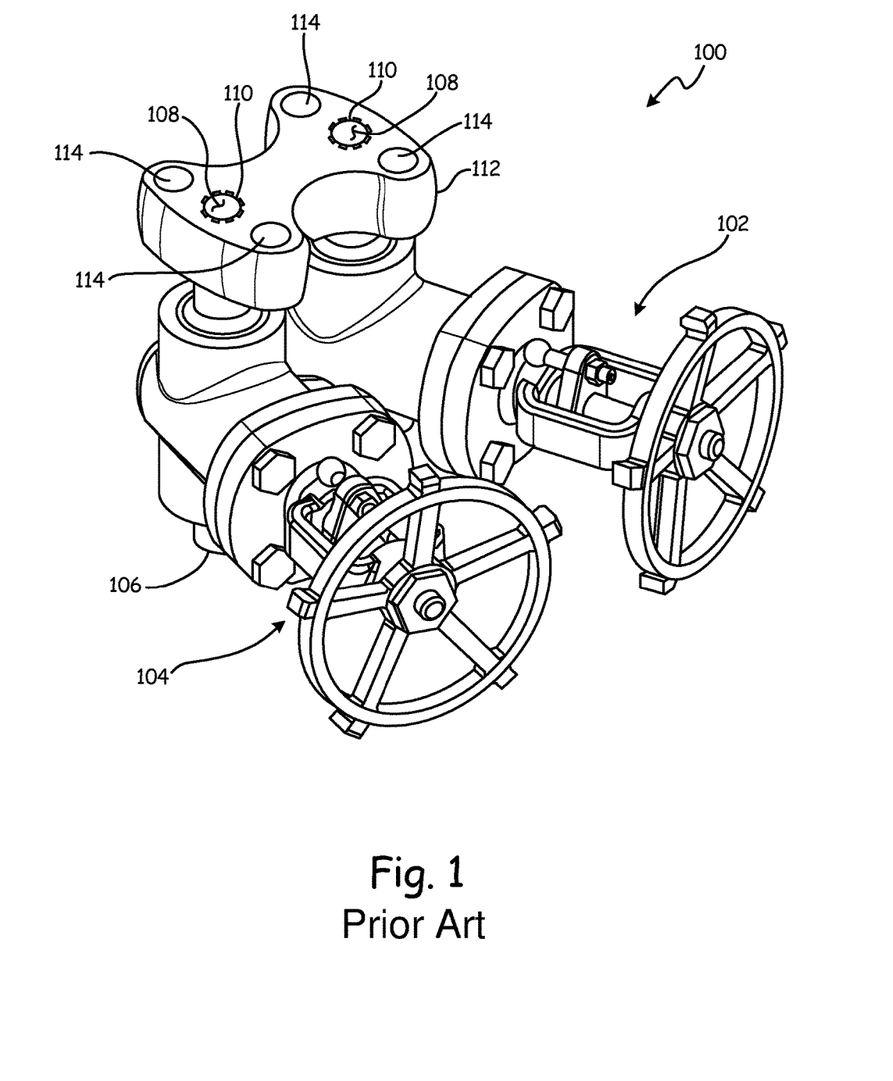
FIG. 1 is a perspective view of a double gate valve.

FIG. 1 shows a standard double gate valve manifold 100 in a root valve configuration, with valves 102 and 104 for use in coupling to a differential pressure of a process fluid. Inlets 106 are configured to couple to a process vessel, such as process piping (not shown). A bore 108 extends through each of the valves 102 and 104 to an outlet member 110. Each valve 102 and 104 of the gate valve 100 opens and closes its bore 108 in known fashion. A mounting block 112 has mounting holes 114 for mounting the gate valve 100 to further parts of a process system, such as differential pressure components or the like. As has been mentioned, process fluid flowing through valves 102 and 104 heats the components of the gate valve 100, including mounting block 112, and consequently, can heat further parts of the process system coupled to the mounting block.

Figure 2:
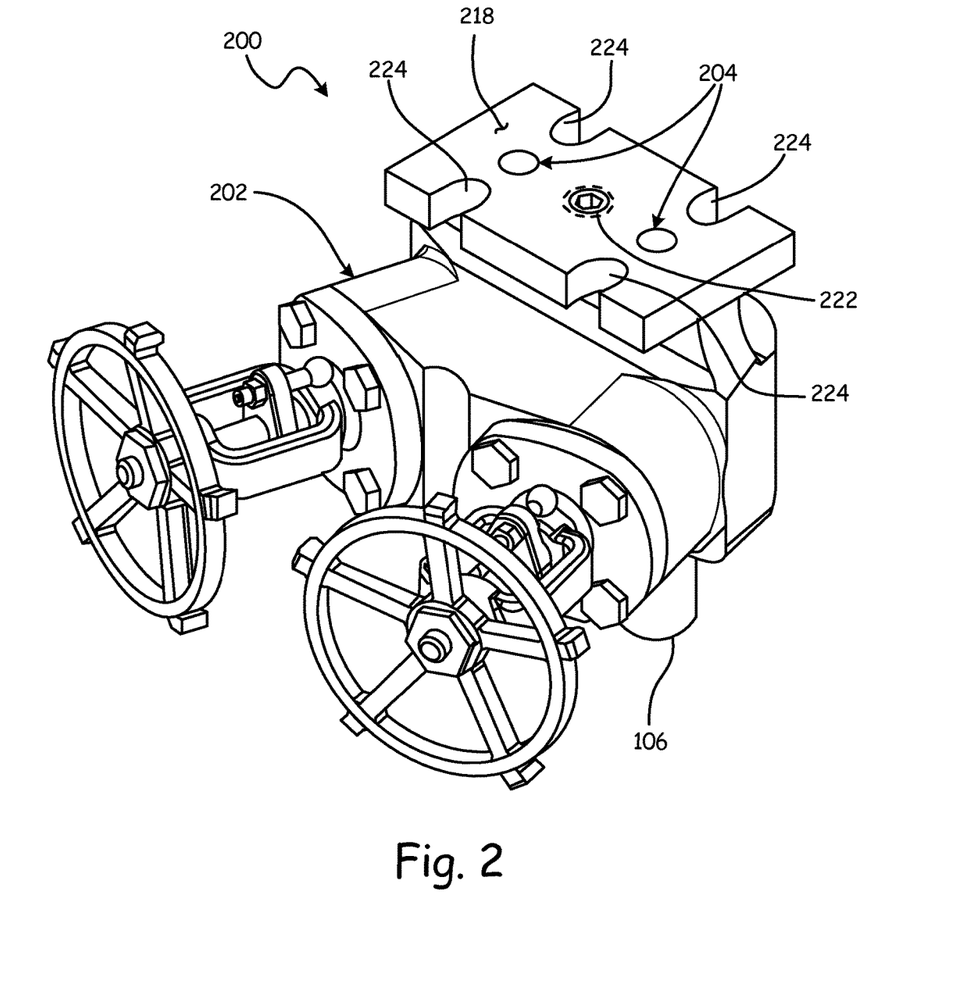
FIG. 2 is a front perspective view of a gate valve manifold according to an embodiment of the present disclosure.
Figure 3:
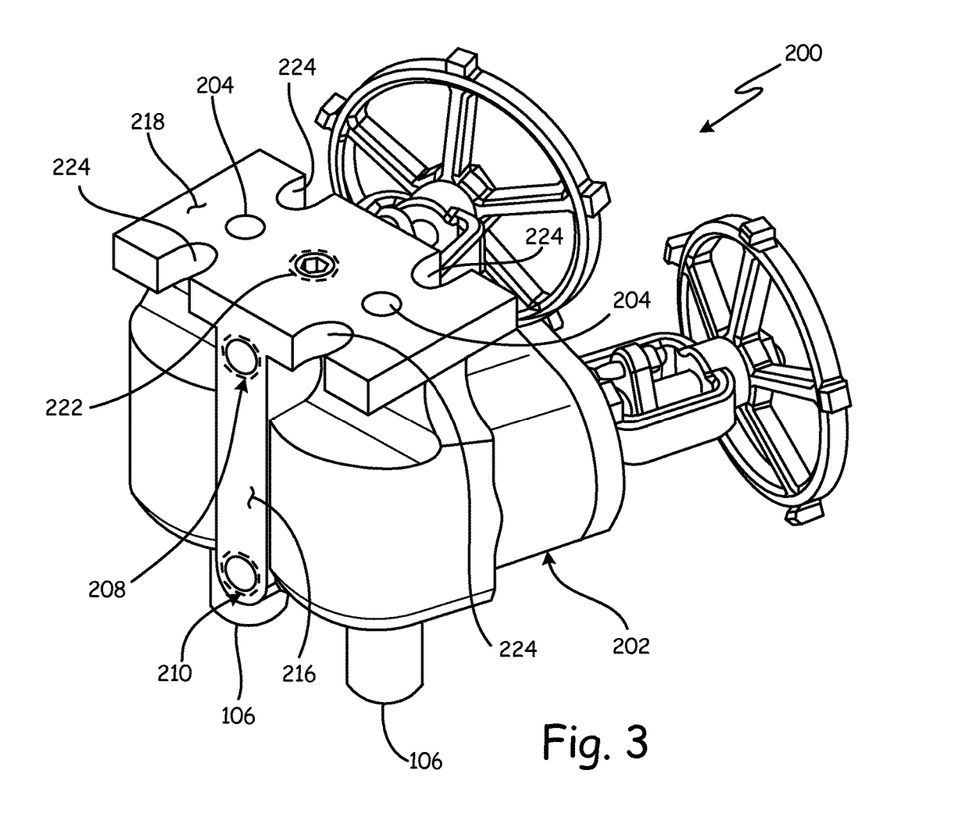
FIG. 3 is a rear perspective view of the gate valve manifold of FIG. 2.

A gate valve manifold 200 according to an embodiment of the disclosure is shown in front and rear perspective views in FIGS. 2 and 3. The gate valve manifold 200 is shown as a double gate valve manifold, but it should be understood that embodiments of the disclosure are amenable to use with gate valve bundles of more or fewer valves without departing from the scope of the disclosure.

Figure 5:
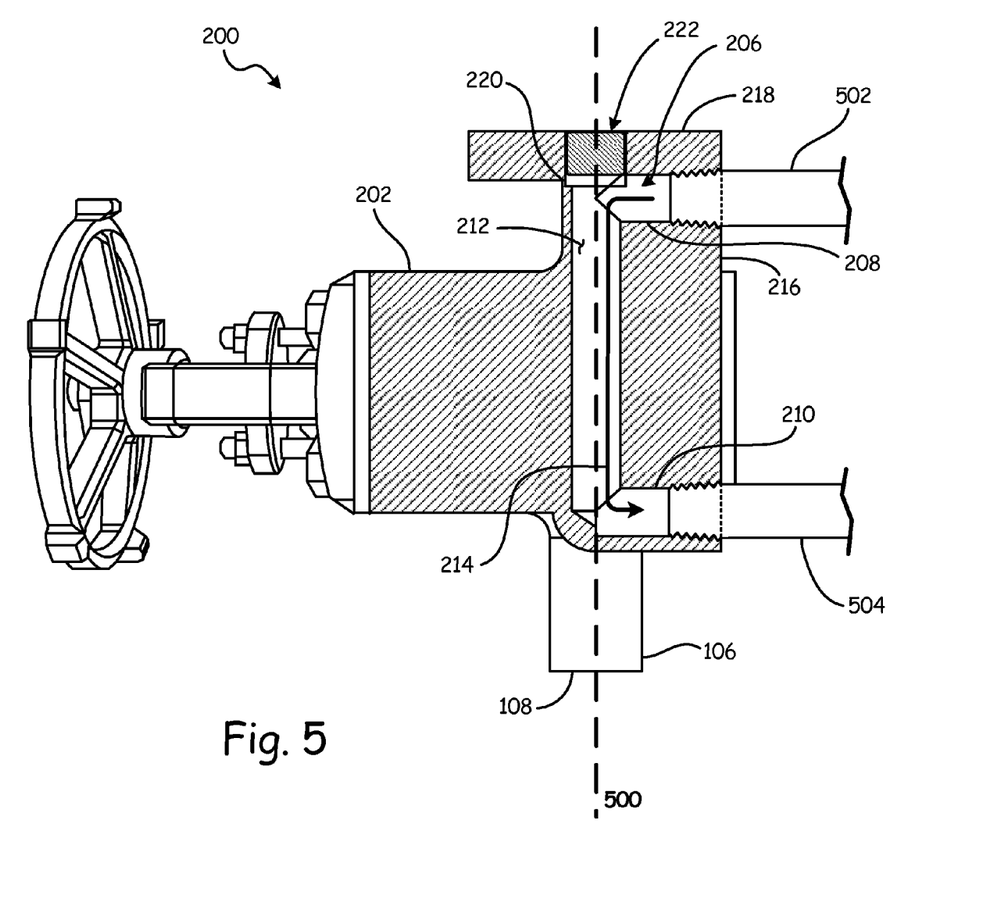
FIG. 5 is a cutaway view of the gate valve manifold of FIG. 4 taken along lines 5-5 thereof.

Gate valve manifold 200 comprises in one embodiment a manifold body 202 surrounding valves such as valves 102 and 104 described above. Manifold 200 has ports 204 for coupling to the outlets 110 of a gate valve such as gate valve 100. Referring now also to FIGS. 3 and 5, manifold 200 has a steam path 206 including steam ports 208 and 210 connected by steam passage 212, with one steam port used as an inlet and one steam port used as an outlet. As shown, steam port 208 is an inlet and steam port 210 is an outlet. Steam passage 212 (FIG. 5) connects the steam ports 208 and 210. Steam path 206 is connectable at its input steam port 208 to a steam supply (see FIG. 5), for example by standard ¼ inch NPT threaded steam piping. While ¼ inch NPT threading is discussed, a reducer may be used to reduce from a ½ inch or other size NPT steam pipe without departing from the scope of the disclosure. The ports are roddable to allow for ensuring a clear passageway.

Figure 4:
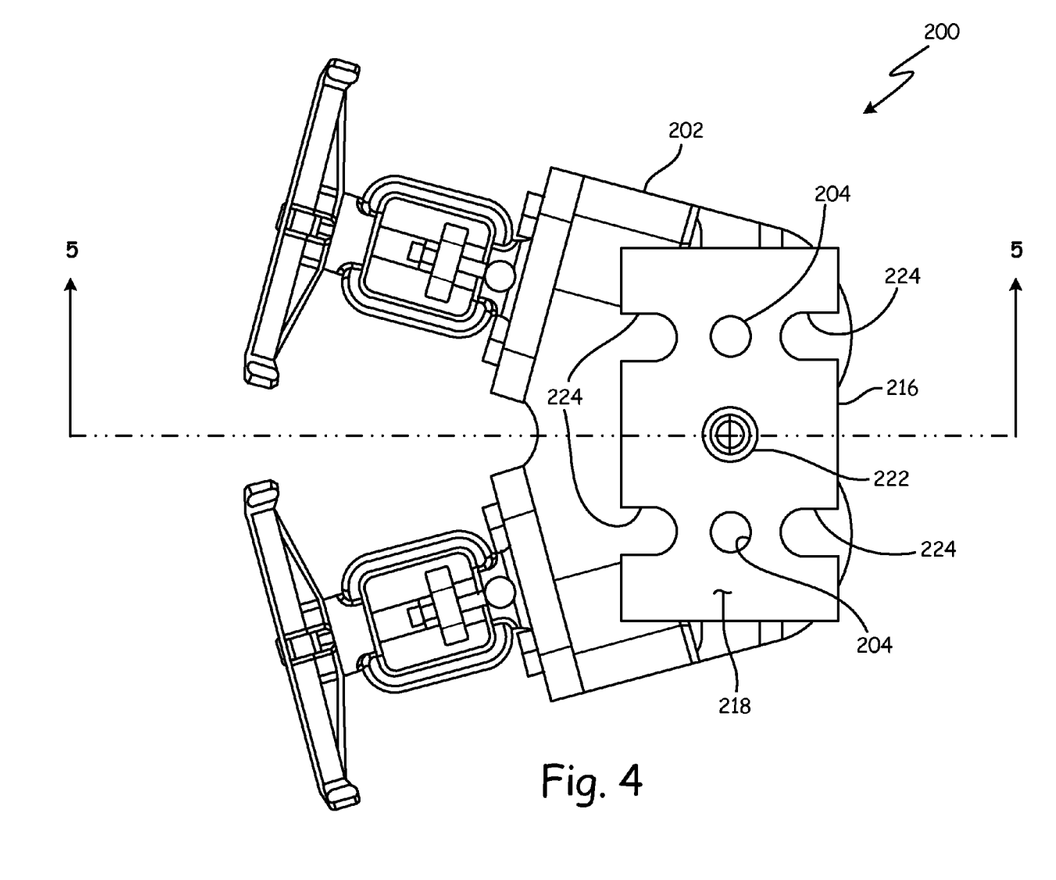
FIG. 4 is a top view of the gate valve manifold of FIG. 2.

FIG. 4 is a top elevation view of the manifold 200 of FIGS. 2 and 3, and FIG. 5 is a cutaway view of the manifold 200 shown along lines 5-5 of FIG. 4. Referring now to FIG. 5, the steam path 206 is shown in greater detail. Steam is provided from inlet steam pipe 502 at inlet steam port 208, and exits manifold 200 at outlet steam port 210 into outlet steam pipe 504 having passed through steam passage 212. Therefore, steam flow in steam path 206 is in the direction of arrow 214, although the inlet 208 and outlet 210 and inlet steam pipe 502 and outlet steam pipe 504 may be reversed without departing from the scope of the disclosure.

Steam path 206 is formed in one embodiment by drilling steam ports 208 and 210 and the steam passage 212 in different drilling operations, with steam ports 208 and 210 drilled from a face 216 of the manifold 200, and passage 212 drilled from a flanged mounting face 218 at a top of the manifold at substantially a right angle to the steam ports 208 and 210. This method of forming the steam passage 212 leaves an opening 220 that is plugged in nottnal operation by a plug 222. Plug 222 may be removed for maintenance of the steam path 206.

Steam passage 212 is in one embodiment aligned with bores 108 of valves 102 and 104, so that passage 212 lies between bores 108, seen most clearly in FIG. 5, where passage 212 and bore 108 align on a plane of axis 500. This configuration places passage 212 between bores 108 and therefore centrally between process fluid that flows in bores 108. Steam passing through steam path 208 is at a predetermined temperature, in one embodiment about 212° F. Passage of process fluid through the bores 108 heats up the manifold body 202. The steam passing through steam path 206 is at a lower temperature than manifold body 202 and cools the manifold body 202. Consequently, heat from the process fluid flowing in bores 108 is transferred to the steam and the process fluid is cooled.

Manifold 200 in one embodiment uses a manifold coupling such as face 218 to allow it to be coupled to further system components, in one embodiment a process variable transmitter, or an isolation manifold, or the like. Coupling with direct coupling or close coupling is available with embodiments of the disclosure since the manifold body is cooled enough not to overheat process variable transmitter electronics. This close or direct coupling eliminates at least some impulse piping, alleviating at least some of the issues with impulse piping described above.

In embodiments of the present disclosure, gate valve manifold 200 may be a separate manifold mounted to a standard double gate valve such as gate valve 100, or may be integrated with a gate valve as a stand-alone gate valve with manifold.

While steam has been described as what is passed through the steam path 206, it should be understood that other fluids may be passed through the steam path without departing from the scope of the disclosure. The steam passage can carry a variety of fluids at a variety of temperatures to cool or heat the manifold. High temperature steam applications or operation in extremely cold environments using close or direct mounted transmitters becomes possible.

Figure 6:
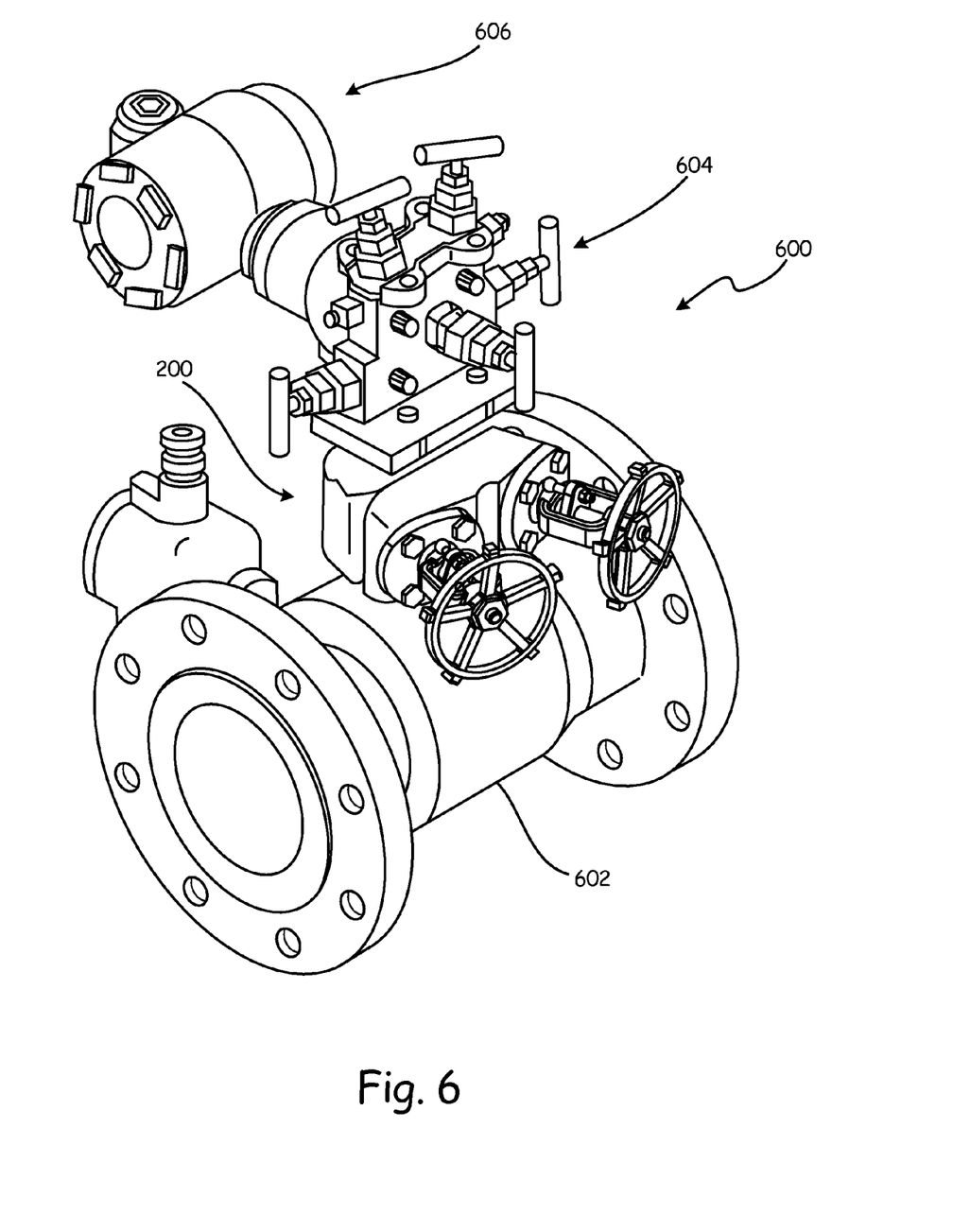
FIG. 6 is a perspective view of a process measurement system according to an embodiment of the present disclosure.

FIG. 6 is a perspective view of a process measurement system 600 for differential pressure operation employing a manifold such as manifold 200. As illustrated in FIG. 6, process piping such as pipe 602 contains process fluid flowing therein. At the location of measurement of some process variable such as flow rate, pressure, or the like, a gate valve manifold such as manifold 200 is mounted to piping 602 and allows passage of process fluid through impulse piping to an isolation manifold 604, shown here as a five valve manifold, although another manifold such as a three valve isolation manifold could also be used. Isolation manifold 604 is mounted to gate valve manifold 200 at its mounting openings 224, and operates in known fashion to generate signals regarding differential pressure at a differential pressure element in the piping 602 that are sent to process variable transmitter 606.

Using steam to cool the manifold allows for primary isolation (root valves) and close coupling of a transmitter such as transmitter 606 to a differential pressure primary in high temperature applications with a minimal amount of impulse piping and leak points, and to keep the process fluid liquid. The balance between keeping the process fluid from solidifiying and shielding the transmitter 606 from overheating is delicate. Steam used to control the temperature of the manifold 202 has enough heat to keep the process fluid from plugging but is also close to the operating temperature limits for most transmitter electronics. With embodiments of the present disclosure allowing direct mounting or closely coupled mounting of a transmitter such as transmitter 606 to process piping such as piping 602, an integrated meter solution may be provided. This saves the customer time and money in the form of energy savings, installation labor, and maintenance.

As process fluid flows in the manifold, conduction between high temperature process fluid and lower temperature piping heats the manifold. As the manifold is coupled to electronics, such as differential pressure measurement electronics and the like, the electronics also heat up. Typical such electronics can operate only up to about 200° F., whereas process fluids at typical temperatures of up to 700° F. heat the manifold, and therefore the electronics coupled to the manifold to a temperature too high for functioning.

Typically, a field device such as transmitter 606 is located at a remote location in a process facility, and transmits a sensed process variable back to a centrally-located control room. Various techniques can be used for transmitting the process variable, including both wired and wireless communications. One common wired communication technique uses a two-wire process control loop in which a single pair of wires is used to both carry information as well as provide power to the transmitter 606. One technique for transmitting information is by controlling the current level through the process control loop between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless process control loop protocols, such as radio-frequency communication techniques including WirelessHART®, may also be implemented. In embodiments of the present disclosure, the transmitter is directly mounted or mounted closely to the process piping, made possible by reducing the temperature of the manifold 200, so that the temperature of the manifold is sufficiently cool that the transmitter electronics are not compromised. In one embodiment, ambient temperature in the vicinity of the system 600 further cools the transmitter to within its operating temperature range.

Figure 7:
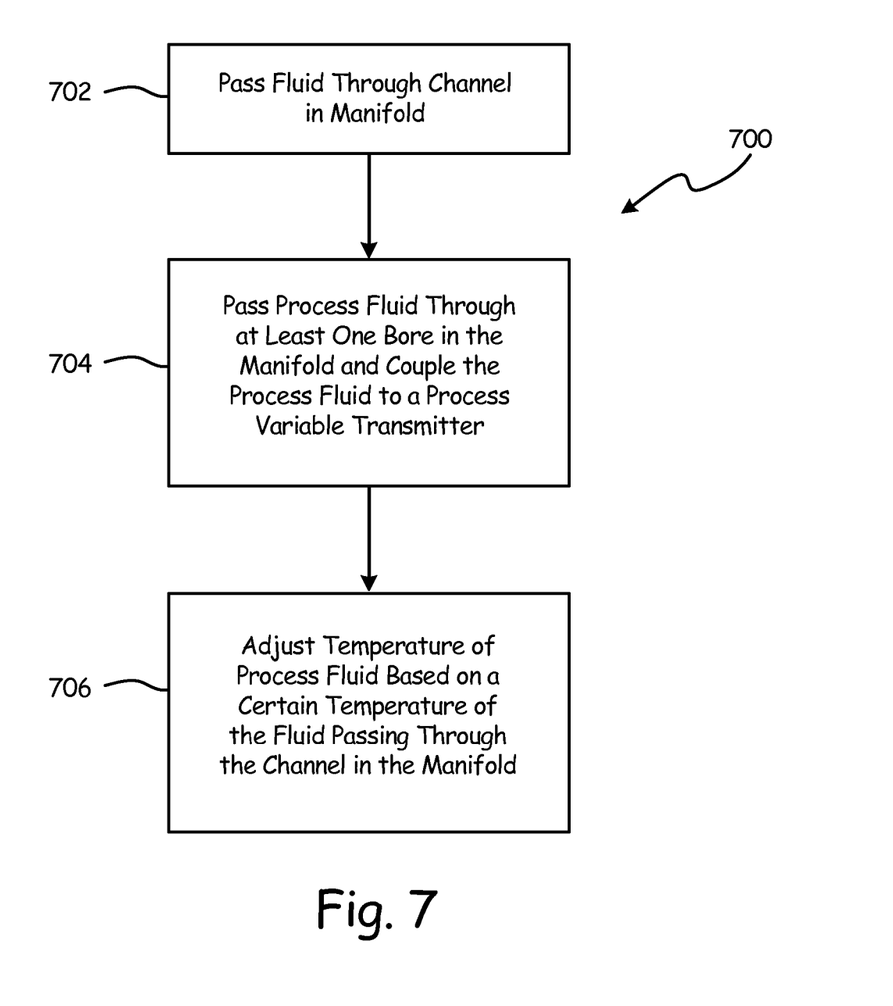
FIG. 7 is a flow chart diagram of a method according to an embodiment of the present disclosure.

A method 700 of controlling temperature of a process fluid in a manifold comprises in one embodiment passing fluid at a certain temperature through a channel in the manifold in block 702, passing the process fluid through at least one bore through the manifold and coupling the process fluid to a process variable transmitter in block 704, and adjusting temperature of the manifold through conductive cooling or heating of the manifold based on the certain temperature of the fluid passing through the channel in block 706. The manifold in one embodiment is a gate valve manifold having one or more bores therethrough. Passing fluid through the channel in this embodiment comprises passing fluid through the channel positioned between the two bores. In one embodiment, the fluid is steam at approximately 212° F. In other embodiments, different temperature steam, or different fluids may be used, to heat or cool the process fluid. Process fluid in one embodiment is coupled to a process variable transmitter using the manifold.

While ambient temperature is used in some embodiments to reduce the temperature of the transmitter to within operating limits, in other embodiments, thermal insulation may be used to assist in isolation of a valve or valves from extreme conditions.

A single steam path 206 is shown in the manifold 200. However, it should be understood that additional steam paths may be bored in manifold 200 without departing from the scope of the disclosure. Further, with a gate valve which has more than two individual valves, a steam path such as steam path 206 may be formed in a manifold between the valves, also without departing from the scope of the disclosure. Also, while operation with respect to differential pressure measurement has been described, it should be understood that other process variables could be measured using the embodiments described herein without departing from the scope of the disclosure.

Although elements have been shown or described as separate embodiments above, portions of each embodiment may be combined with all or part of other embodiments described above. Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A gate valve manifold, comprising:
a gate valve body having a first gate valve with a first bore extending between a first inlet and a first outlet;
a manifold body having a first port for coupling to the first outlet; and
a steam path channel in the manifold body, the steam path channel having a steam inlet port and a steam outlet port extending in a first direction substantially perpendicular to the first bore, the steam inlet port and the steam outlet port connected by a steam passage, the steam path channel connectable to an external source of steam;
wherein the steam passage is substantially parallel to the first bore.

2. The gate valve manifold of claim 1, wherein at least one of the manifold body first port, the steam inlet port, and the steam outlet port is roddable.

3. The gate valve manifold of claim 1, wherein the steam inlet port and the steam outlet port are substantially parallel to each other, and wherein the steam passage is substantially perpendicular to the steam inlet port and the steam outlet port.

4. The gate valve manifold of claim 1, wherein the steam path channel is connectable to the external source by ¼ inch National Pipe Taper threaded piping.

5. The gate valve manifold of claim 1, wherein the gate valve body has a second gate valve with a second bore extending between a second inlet and a second outlet, and wherein the manifold body has a second port for coupling to the second outlet.

6. The gate valve manifold of claim 5, wherein the steam path channel is positioned between the first bore and the second bore.

7. A process variable transmitter manifold, comprising:
a valve body having a first gate valve element, the first gate valve element having a first bore extending between a first inlet and a first outlet for selectively passing a process fluid therethrough; and
a manifold body separate from and mounted to the valve body, the manifold body having a flanged mounting face with a port coupled to the first outlet, and the manifold body having a cooling channel having an inlet port and an outlet port each extending substantially perpendicular to the first bore, and a passage substantially perpendicular to the inlet port and the outlet port connecting the inlet port and the outlet port;
wherein the passage is substantially parallel to the first bore.

8. The manifold of claim 7, wherein the valve body has a second valve element having a second bore therethrough for selectively passing the process fluid therethrough, wherein the cooling channel is positioned between the first valve element and the second valve element.

9. The manifold of claim 8, wherein the cooling channel is between the bores of the valve body.

10. The manifold of claim 8, wherein at least one of the first bore and the second bore is roddable.

11. The manifold of claim 8, wherein the passage is substantially parallel to the second bore.

12. The manifold of claim 11, wherein the passage, the first bore, and the second bore, are coplanar.

13. The manifold of claim 7, wherein the cooling channel is connectable to a steam source to cool or heat the manifold.

14. The manifold of claim 7, wherein the inlet port and the outlet port are substantially parallel to each other.

15. The manifold of claim 14, and further comprising a supply pipe connected to an inlet opening of the inlet port to control a temperature of the manifold by passing a fluid of a certain temperature through the cooling channel from the inlet port to the passage to the outlet port.

16. A method of controlling a temperature of a process fluid in a manifold, comprising:
coupling the process fluid to a process variable transmitter through at least one bore through the manifold, the bore comprising a gate valve extending between a first inlet and a first outlet;

passing fluid at a temperature through a channel in the manifold separate from the at least one bore, the channel in the manifold comprising an inlet port and an outlet port, each substantially perpendicular to the at least one bore, and a manifold channel passage substantially parallel to the bore, the inlet port and the outlet port connected by the manifold channel passage; and adjusting temperature of the manifold through conductive cooling or heating of the manifold based on the temperature of the fluid passing through the channel, wherein the channel in the manifold and the at least one bore are substantially parallel.

17. The method of claim 16, wherein the manifold is a gate valve manifold having two bores therethrough, and wherein passing fluid through the channel comprises passing fluid through the channel positioned between the two bores.

18. The method of claim 16, wherein passing a fluid through the channel in the manifold comprises passing steam through the channel in the manifold.

19. A method of controlling a temperature of a manifold, comprising:

passing steam through a manifold channel to heat or cool the manifold;

coupling a process fluid to a process variable transmitter using a bore in a gate valve coupled to the manifold, the bore extending between a first inlet and a first outlet, and separate from and substantially parallel to the manifold channel, the manifold channel connected between an inlet port and an outlet port each substantially perpendicular to the bore and to the manifold channel; and heating or cooling the manifold using a temperature differential between a temperature of the process fluid and a temperature of the steam.

20. A process measurement system, comprising:

a gate valve manifold;

an isolation manifold separate from and coupled to the gate valve manifold, the gate valve manifold selectively coupling a process fluid to the isolation manifold; and a process variable transmitter directly mounted to the isolation manifold;

wherein the gate valve manifold comprises:
a gate valve having a bore extending between an inlet and an outlet; and wherein the isolation manifold comprises:
a manifold body having a port for coupling to the outlet of the gate valve; and
a steam path channel in the manifold body, the steam path having a steam inlet port and a steam outlet port connected by a steam passage, the steam path channel connectable to an external source of steam, and the steam passage being substantially parallel to the gate valve bore.

* * * * *